United States Patent

Sakakibara et al.

(10) Patent No.: US 9,580,010 B2
(45) Date of Patent: Feb. 28, 2017

(54) VEHICLE APPROACH NOTIFICATION APPARATUS

(71) Applicant: Anden Co., Ltd., Anjo, Aichi-pref. (JP)

(72) Inventors: Hiroshi Sakakibara, Anjo (JP); Hironari Tajimi, Obu (JP)

(73) Assignee: Anden Co., Ltd., Anjo, Aichi-pref. (JP)

( * ) Notice: Subject to any disclaimer, the term of this patent is extended or adjusted under 35 U.S.C. 154(b) by 0 days.

(21) Appl. No.: 15/024,491

(22) PCT Filed: Sep. 9, 2014

(86) PCT No.: PCT/JP2014/004610
§ 371 (c)(1),
(2) Date: Mar. 24, 2016

(87) PCT Pub. No.: WO2015/045295
PCT Pub. Date: Apr. 2, 2015

(65) Prior Publication Data
US 2016/0229340 A1    Aug. 11, 2016

(30) Foreign Application Priority Data

Sep. 27, 2013  (JP) .................................. 2013-201072

(51) Int. Cl.
*B60Q 1/00* (2006.01)
*B60Q 5/00* (2006.01)

(52) U.S. Cl.
CPC ................................. *B60Q 5/008* (2013.01)

(58) Field of Classification Search
CPC ....................................................... B60Q 5/008
See application file for complete search history.

(56) References Cited

U.S. PATENT DOCUMENTS 3,624,298 A * 11/1971 Davis ...................... H03G 5/10
                                                        333/28 R
3,917,024 A * 11/1975 Kaiser, Jr. .............. G10K 13/00
                                                        181/155

(Continued)

FOREIGN PATENT DOCUMENTS

JP         H05213112 A     8/1993
JP         2011255847 A    12/2011

(Continued)

OTHER PUBLICATIONS

International Search Report and Written Opinion (in Japanese with English Translation) for PCT/JP2014/004610, mailed Dec. 9, 2014; ISA/JP.

*Primary Examiner* — Curtis King
(74) *Attorney, Agent, or Firm* — Harness, Dickey & Pierce, P.L.C.

(57) ABSTRACT

A vehicle approach notification apparatus includes a first sounding signal generation portion that generates a first sounding signal based on a first sound source data; a second sounding signal generation portion that generates a second sounding signal based on a second sound source data; and a combination portion that combines the first sounding signal with the second sounding signal to generate a notice sound signal. The first sounding signal generation portion changes a frequency and an output level of the first sounding signal depending on a speed of the vehicle. The second sounding signal generation portion changes an output level of the second sounding signal depending on the speed of the vehicle while holding a frequency of the second sounding signal to be constant.

9 Claims, 6 Drawing Sheets (56) References Cited

U.S. PATENT DOCUMENTS

| | | | | |
|---|---|---|---|---|
| 4,160,339 A * | 7/1979 | Dankman | ............... | G10K 15/02 340/964 |
| 4,191,864 A * | 3/1980 | Sopher | ................... | H04R 25/30 381/60 |
| 5,450,494 A * | 9/1995 | Okubo | ..................... | H03G 3/32 348/E5.122 |
| 5,635,903 A * | 6/1997 | Koike | .................... | A63H 17/34 340/384.1 |
| 6,119,745 A * | 9/2000 | Sugihara | ............ | B60C 11/0083 152/209.15 |
| 6,731,202 B1* | 5/2004 | Klaus | .................... | B60Q 1/525 340/425.5 |
| 7,010,129 B1* | 3/2006 | Schaaf | .................... | H04R 3/02 381/86 |
| 7,979,147 B1* | 7/2011 | Dunn | .................... | G10K 15/02 181/192 |
| 9,162,619 B2* | 10/2015 | Aoyagi | ................. | B60Q 5/008 |
| 2003/0122420 A1* | 7/2003 | Tarabishy | ............... | B60T 7/042 303/191 |
| 2004/0172959 A1* | 9/2004 | Oomura | ................ | B60H 1/3205 62/228.1 |
| 2005/0232432 A1* | 10/2005 | Yasushi | ................... | B60Q 9/00 381/17 |
| 2009/0066499 A1* | 3/2009 | Bai | ....................... | G10K 15/04 340/459 |
| 2009/0080672 A1* | 3/2009 | Smith | .................... | B60Q 5/008 381/86 |
| 2009/0085770 A1* | 4/2009 | Mergen | ................. | B60Q 5/008 340/904 |
| 2010/0018500 A1* | 1/2010 | Itano | ....................... | F02P 5/152 123/406.38 |
| 2010/0185411 A1* | 7/2010 | Pfeiffer | ................... | G08G 1/01 702/150 |
| 2010/0266135 A1* | 10/2010 | Theobald | .............. | G10K 11/178 381/71.4 |
| 2011/0018729 A1* | 1/2011 | Kim | .................... | H04L 12/2825 340/679 |
| 2011/0032087 A1* | 2/2011 | Nakayama | ............ | B60Q 5/008 340/384.1 |
| 2011/0128161 A1* | 6/2011 | Bae | ........................ | B60Q 1/506 340/901 |
| 2011/0188663 A1* | 8/2011 | Nakayama | ............ | G10K 15/02 381/57 |
| 2011/0199199 A1* | 8/2011 | Perkins | .................. | B60Q 1/506 340/435 |
| 2012/0098656 A1* | 4/2012 | Ikeda | .................... | B60Q 5/005 340/438 |
| 2012/0130580 A1 | 5/2012 | Omote et al. | | |
| 2012/0293318 A1* | 11/2012 | Saito | ........................ | B60Q 9/00 340/463 |
| 2012/0296520 A1* | 11/2012 | Saito | ........................ | B60Q 1/22 701/36 |
| 2013/0094331 A1* | 4/2013 | Watanabe | ............. | B60Q 5/008 367/137 |
| 2013/0102937 A1* | 4/2013 | Ehrenreich | ............. | A61H 1/00 601/47 |
| 2013/0182855 A1* | 7/2013 | Choi | ........................ | H04R 25/30 381/23.1 |
| 2015/0264500 A1* | 9/2015 | Aoyagi | ................. | H04R 29/00 381/56 |
| 2015/0269925 A1* | 9/2015 | Kanaya | ................. | B60Q 5/008 381/71.4 |

FOREIGN PATENT DOCUMENTS

| | | |
|---|---|---|
| JP | 2012066688 A | 4/2012 |
| JP | 2012111343 A | 6/2012 |
| JP | 2012232699 A | 11/2012 |
| WO | WO-2011148534 A1 | 12/2011 |

* cited by examiner

VEHICLE APPROACH NOTIFICATION APPARATUS

CROSS REFERENCE TO RELATED APPLICATIONS

This application is a U.S. National Phase Application under 35 U.S.C. 371 of International Application No. PCT/JP2014/004610 filed on Sep. 9, 2014 and published in Japanese as WO 2015/045295 A1 on Apr. 2, 2015. This application is based on and claims the benefit of priority from Japanese Patent Application No. 2013-201072 filed on Sep. 27, 2013. The entire disclosures of all of the above applications are incorporated herein by reference.

TECHNICAL FIELD

The present disclosure relates to a vehicle approach notification apparatus that outputs a notice sound according to a notice sound signal via a speaker.

BACKGROUND ART

An electric vehicle equipped with only an electric motor as driving source for travel outputs very quiet running sounds during low speed running. Further, a hybrid vehicle equipped with an electric motor and an internal-combustion engine as driving source for travel outputs very quiet running sounds during low speed running only with an electric motor as driving source. This may cause pedestrians etc. to fail to notice an approach of such vehicles.

There is proposed for such a low noise vehicle a vehicle approach notification apparatus which notifies nearby pedestrians etc. of the presence of the vehicle by generating a notice sound signal whose frequency changes depending on the vehicle speed and outputting a notice sound based on the generated notice sound signal towards an area external to the vehicle (e.g., refer to Patent Literature 1).

In addition, some notice sounds include pseudo engine sounds or pseudo running sounds that are generated as composite tones (chords) formed of several frequency components. Furthermore, to enable pedestrians etc. to recognize vehicle speeds, some notice sounds are processed such that the frequency of each frequency component constituting a notice sound is increased as the vehicle speed increases.

PRIOR ART LITERATURES

Patent Literature

Patent Literature 1: JP H05-213112 A

SUMMARY OF INVENTION

Technical Problem

To allow pedestrians etc. to recognize the feeling of the speed of the vehicle, such a vehicle approach notification apparatus is demanded to change the frequency and sound pressure of a notice sound depending on the speed of the vehicle, such that as the vehicle speed increases, the frequency component constituting the notice sound is shifted towards a higher frequency and the sound pressure of the notice sound is raised.

Note that some apparatuses, which change the frequency of the notice sound depending on the vehicle speed, is caused to change the sound pressure of some frequency components constituting the notice sound due to the frequency characteristic of the speaker. To be specific, in the frequency band where a speaker characteristic of the output sound pressure versus frequencies is flat, the output sound pressure of each frequency component outputted from the speaker does not change even if the frequency of each frequency component constituting a notice sound changes. In contrast, in the frequency band where the speaker characteristic of the output sound pressure versus frequencies is not flat, the output sound pressure of each frequency component outputted from the speaker becomes greater or smaller when the frequency of each frequency component constituting a notice sound changes. For example, suppose that all the frequency components which constitute a notice sound is subjected to a frequency shift depending on the vehicle speed. In such a case, the sound pressure of the notice sound may be proper in a certain speed zone, whereas the sound pressure of the notice sound may become outside of a standard range and thus improper in a different speed zone. This leads to a difficulty for a pedestrian etc. to notice a vehicle approach or, alternatively, leads to a disadvantage for a notice sound to be heard as noise.

Further, as explained above, in the frequency band where the speaker characteristic of the output sound pressure versus frequencies is not flat, the output sound pressure of each frequency component outputted from the speaker becomes greater or smaller when the frequency of each frequency component which constitutes the notice sound is changed. This disrupts the balance of each frequency component which constitutes the notice sound, causing the notice sound to sound to be significantly different.

Note that in consideration of the speaker characteristic of the output sound pressure versus frequencies, the level of each frequency component which constitutes the notice sound may be controlled individually to become an appropriate value. This may prevent the sound pressure of the notice sound from becoming unsuitable, but needs a complicated control and high speed processing, requiring an efficient processing circuit such as DSP to lead to high costs.

The present disclosure, which is made in view of the above issue, has an object to provide a vehicle approach notification apparatus, which suppresses the variation of sound pressures of notice sounds due to a speaker characteristic of the output sound pressure versus frequencies, enabling pedestrians etc. to recognize the feeling of the speed of the vehicle without need of a highly efficient processing circuit.

Solution to Problem

According to an example of the present disclosure, a vehicle approach notification apparatus is provided which includes a notice sound generation device that generates a notice sound signal corresponding to a notice sound that is to be outputted via a speaker. The notice sound generation device includes a first sounding signal generation portion; a second sounding signal generation portion; and a combination portion. The first sounding signal generation portion generates a first sounding signal based on a first sound source data. The second sounding signal generation portion generates a second sounding signal based on a second sound source data. The combination portion combines the first sounding signal with the second sounding signal, generating the notice sound signal. Herein, the first sounding signal generation portion changes a frequency and an output level of the first sounding signal depending on a speed of the vehicle; the second sounding signal generation portion changes an output level of the second sounding signal depending on the speed of the vehicle while holding a frequency of the second sounding signal to be constant.

The vehicle approach notification apparatus thus dispenses with a highly efficient processing circuit, suppresses the sound pressure of the notice sound from becoming unsuitable due to the influence of speaker characteristic of the output sound pressure versus frequencies, and enables pedestrians etc. to recognize the feeling of the speed of the vehicle. Furthermore, the vehicle approach notification apparatus suppresses the speaker characteristic of the output sound pressure versus frequencies from disrupting the balance of each frequency component which constitutes the notice sound to cause the notice sound to sound to be significantly different.

According to another example of the present disclosure, a vehicle approach notification apparatus is provided to be mounted to a vehicle, permitting a speaker to output a notice sound according to a notice sound signal. The vehicle approach notification apparatus includes a vehicle speed determination portion, a storage unit, a control unit, and an amplifier. The vehicle speed determination portion determines a vehicle speed of the vehicle. The storage unit stores a first sound source data and a second sound source data. The control unit generates a first sounding signal based on the first sound source data and a second sounding signal based on the second sound source data. The control unit includes a first sounding signal generation portion that changes a frequency and an output level of the first sounding signal depending on a change of the vehicle speed, and a second sounding signal that changes an output level of the second sounding signal depending on a change of the vehicle speed while maintaining a frequency of the second sounding signal to be constant. The combination portion combines the first sounding signal outputted from the first sounding signal generation portion with the second sounding signal outputted from the second sounding signal generation portion, generating the notice sound signal. The amplifier amplifies the notice sound signal generated by the combination portion to provide an amplified output and applies an electric current corresponding to the amplified output to the speaker.

The vehicle approach notification apparatus dispenses with a highly efficient processing circuit that is used to amend the respective frequency components which constitute a notice sound, suppresses the sound pressure of the notice sound from becoming unsuitable due to the influence of the speaker characteristic of the output sound pressure versus frequencies, and enables pedestrians etc. to recognize the feeling of the speed of the vehicle.

BRIEF DESCRIPTION OF DRAWINGS

The above and other objects, features, and advantages of the present disclosure will become more apparent from the following detailed description made with reference to the accompanying drawings. In the drawings.

DESCRIPTION OF EMBODIMENTS

Figure 1:
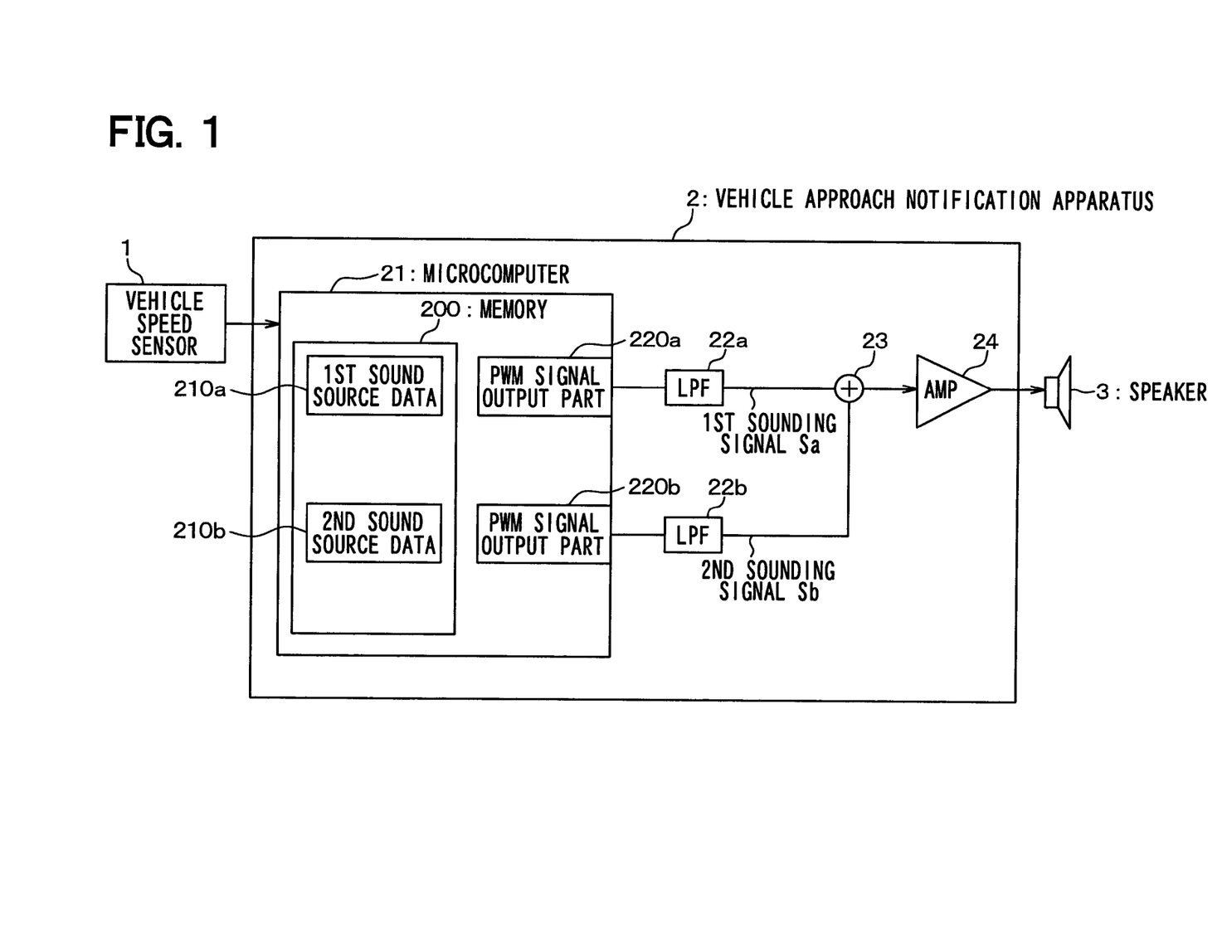
FIG. 1 is a diagram illustrating a configuration of a vehicle approach notification system including a vehicle approach notification apparatus according to an embodiment of the present disclosure.

FIG. 1 is a diagram illustrating a configuration of a vehicle approach notification system including a vehicle approach notification apparatus according to an embodiment of the present disclosure. The vehicle approach notification system, which is mounted in a hybrid vehicle running with power sources of an engine and a motor, includes a speed sensor 1, a vehicle approach notification apparatus 2, and a speaker 3.

The vehicle approach notification apparatus 2 generates notice sound signals for outputting notice sounds during low-speed running that exhibits smaller road noises, sounds notice sounds according to the notice sound signals via the speaker 3, and notifies nearby pedestrians etc. that the vehicle approaches. In the present embodiment, the vehicle approach notification apparatus 2 is provided as a different body that is separate from the speaker 3; alternatively, the speaker 3 and the vehicle approach notification apparatus 2 may be provided to be combined as a single body.

The speed sensor 1 outputs speed signals that indicate a travel speed of the vehicle. The vehicle approach notification apparatus 2 controls sounding depending on the speed signals.

The vehicle approach notification apparatus 2 includes a microcomputer 21, low pass filters (hereinafter LPFs) 22a and 22b, a mixer 23, and an amplifier (hereinafter AMP) 24. The vehicle approach notification apparatus 2 receives speed signals from the speed sensor 1. In addition, the vehicle approach notification apparatus 2 is connected with the speaker 3.

The microcomputer 21 includes a memory 200 and PWM (Pulse Width Modulation) signal output parts 220a and 220*b*, along with unshown parts such as an arithmetic unit and inputs and outputs (I/Os). The arithmetic unit of the microcomputer 21 executes various processes according to programs stored in the memory 200.

In addition to the various programs, the memory 200 stores a first sound source data 210*a* and a second sound source data 210*b* to be independent of each other. The first sound source data 210*a* generates a first sounding signal Sa with low frequency components that constitute a notice sound signal; the second sound source data 210*b* generates a second sounding signal Sb with high frequency components that constitute the notice sound signal. Each sound source data 210*a* and 210*b* is provided as a PCM (Pulse Code Modulation) sound source data, which are prepared such that the signals of frequency components are subjected to sampling and quantization to produce processed signals, whose magnitudes are expressed in numeral data.

The arithmetic unit of the microcomputer 21 performs a process according to the program stored in the memory 200, to permit the PWM signal output parts 220*a* and 220, respectively, to output the PWM signals based on each sound source data 210*a* and 210*b* independently stored in the memory 200.

To be specific, the respective sound source data 210*a* and 210*b* are read from the memory 200; the duty ratios of the PWM signals, etc. are calculated from the respective sound source data 210*a* and 210*b*; the PWM signals according to the calculated duty ratios are outputted repeatedly from the PWM signal output parts 220*a* and 220*b*.

The LPFs 22*a* and 22*b* output signals that are obtained by removing high frequency components of PWM signals inputted from the PWM signal output parts 220*a* and 220*b*, respectively. The LPFs 22*a* and 22*b* in the present embodiment play the roles of converting the PWM signals into analog signals.

The mixer 23 outputs a notice sound signal which is obtained by combining a signal inputted from the LPF 22*a*, and a signal inputted from the LPF 22*b*.

The AMP 24 amplifies a notice sound signal outputted from the mixer 23 using a constant amplification factor, and passes the electric current corresponding to the amplified notice sound signal through the speaker 3.

The speaker 3 outputs a notice sound according to the notice sound signal outputted from the AMP 24. Note that the speaker 3 outputs the notice sound having a greater sound pressure as the amount of electric current supplied from the AMP 24 is greater. In addition, the speaker 3 may be provided as a buzzer on piezo electricity.

In the above configuration, the PWM signal generated by the PWM signal output part 220*a* of the microcomputer 21 is converted into an analog signal using the LPF 22*a*; thereby, a first sounding signal Sa is outputted from the LPF 22*a*. Further, the PWM signal generated by the PWM signal output part 220*b* of the microcomputer 21 is converted into an analog signal using the LPF 22*b*; thereby, a second sounding signal Sb is outputted from the LPF 22*b*. The first sounding signal Sa and the second sounding signal Sb are then combined by the mixer 23; thereby, a composite signal having undergone the combination by the mixer 23 is amplified by the AMP 24 with a constant amplification factor to be outputted as voices from the speaker 3.

The present embodiment has objects such as: pedestrians etc. are enabled to recognize the feeling of the speed of a vehicle; the sound pressure of a notice sound is suppressed from becoming unsuitable due to the influence of the speaker characteristic of the output sound pressure versus frequencies; and the balance of each frequency component which constitutes the notice sound is suppressed from varying due to the influence of the speaker characteristic of the output sound pressure versus frequencies. To achieve such objects, the arithmetic unit of the microcomputer 21 performs the following processes. A process is to shift the frequency of the first sounding signal Sa to a higher frequency while increasing the output level of the first sounding signal Sb, as the speed of the vehicle increases; and another process is to increase the output level of the second sounding signal Sb while maintaining the frequency of the second sounding signal Sb to be constant, as the speed of the vehicle increases.

To be specific, the arithmetic unit of the microcomputer 21 controls the PWM signal output part 220*a* so as to shorten the cycle of the first sounding signal Sa while increasing the duty ratio of the first sounding signal Sa according to the increase of the speed of the vehicle. This shifts the frequency of the first sounding signal Sa to a higher frequency while increasing the output level of the first sounding signal Sa as the speed of the vehicle increases.

In addition, the arithmetic unit of the microcomputer 21 controls the PWM signal output part 220*b* so as to increase the duty ratio of the second sounding signal Sb while holding the cycle of the second sounding signal Sb constant, according to the increase of the speed of the vehicle. This increases the output level of the second sounding signal Sb as the speed of the vehicle increases while maintaining the frequency of the second sounding signal Sb to be constant.

Note that the average voltage of the PWM signal changes depending on the duty ratio of the pulse wave. That is, increasing the duty ratio of each sounding signal outputted by the PWM signal output parts 220*a* and 220*b* as a whole results in increasing the level of the signal outputted from the LPFs 22*a* and 22*b*. By contrast, decreasing the duty ratio of each sounding signal outputted by the PWM signal output parts 220*a* and 220*b* as a whole results in decreasing the level of the signal outputted from the LPFs 22*a* and 22*b*. The present embodiment changes the duty ratio of the first sounding signal Sa or the second sounding signal Sb to thereby change the output level of the first sounding signal Sa or the second sounding signal Sb, respectively.

Figure 2A:
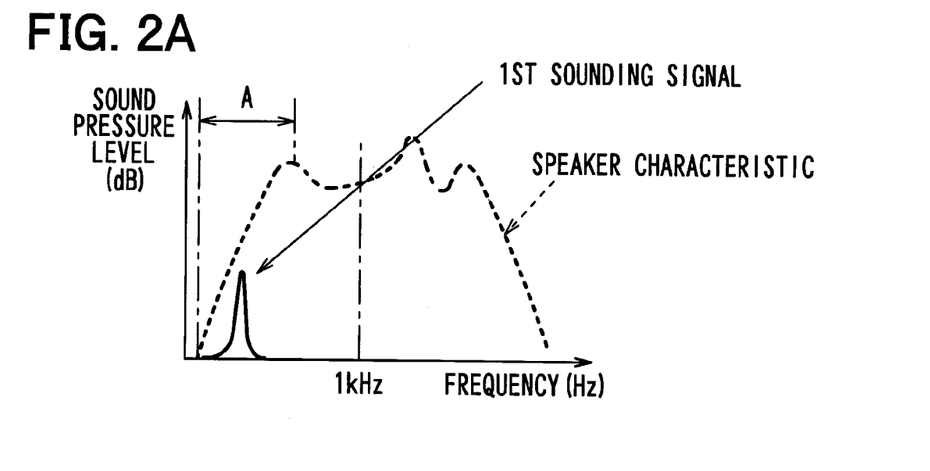
FIG. 2A is a diagram illustrating a frequency characteristic of a first sounding signal at a vehicle speed of 0 km/h.
Figure 2B:
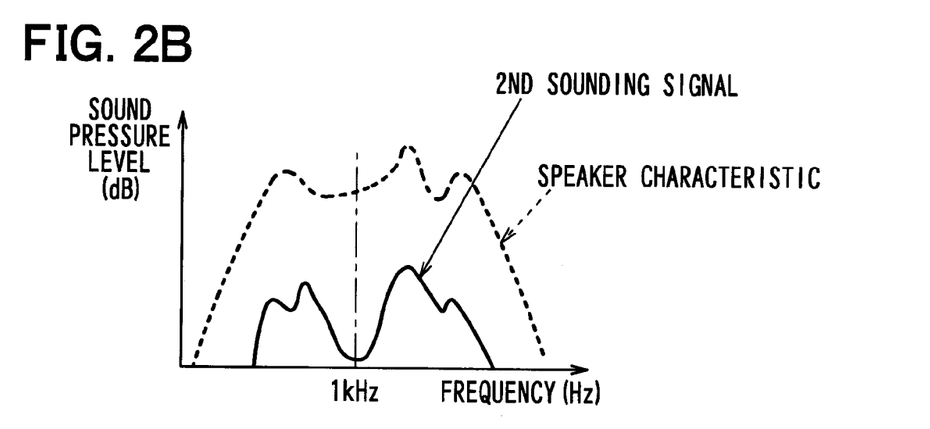
FIG. 2B is a diagram illustrating a frequency characteristic of a second sounding signal at a vehicle speed of 0 km/h.
Figure 2C:
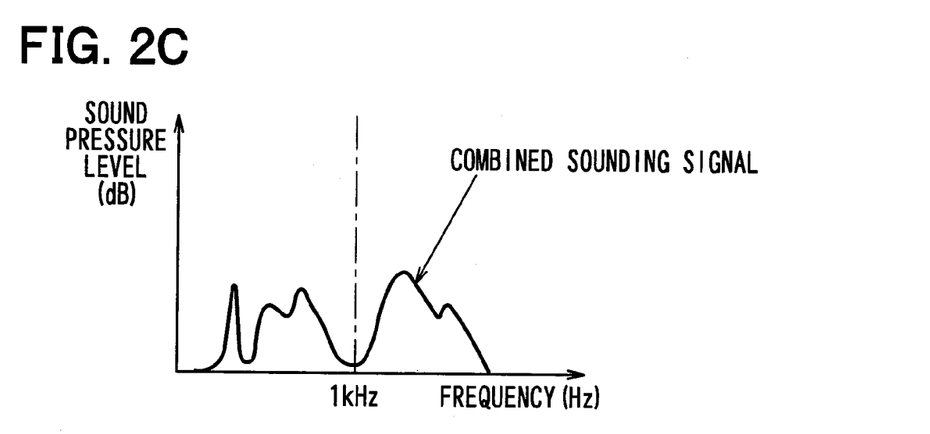
FIG. 2C is a diagram illustrating a frequency characteristic of a notice sound signal combining a first sounding signal with a second sounding signal at a vehicle speed of 0 km/h.

FIGS. 2A to 2C are diagrams illustrating respective frequency characteristics of the first sounding signal Sa, the second sounding signal Sb, and a notice sound signal that is prepared by combining the first sounding signal Sa with a second sounding signal Sb at a vehicle speed of 0 km/h. In the present embodiment, the frequency band of the first sounding signal ranges approximately from 125 to 315 Hertz (Hz); the frequency band of the second sounding signal ranges approximately from 400 to 4000 Hertz (Hz). In addition, the first sounding signal includes one frequency component; the second sounding signal includes a plurality of frequency components (e.g., eight (frequency peaks appear on eight bands on the basis of ⅓ octave band)). The present embodiment changes the frequency of the first sounding signal by changing the cycle of the first sounding signal. Further, FIGS. 2A and 2B each illustrate a characteristic of the output sound pressure versus frequencies with respect to the speaker 3 (speaker characteristic).

When the peak value of the sound pressure level (output level) of the first sounding signal is lower than the peak value of the sound pressure level (output level) of the second sounding signal, a phenomenon called masking occurs. The masking is caused by the frequency component of the second sounding signal that buries the frequency component of the first sounding signal, which is to be difficult to catch. This leads to a difficulty for pedestrians etc. to recognize the feeling of the speed of the vehicle. The present embodiment provides the peak value of the sound pressure level (output level) of the first sounding signal to be higher than the peak value of the sound pressure level (output level) of the second sounding signal.

In addition, when mutually different frequencies of two signals are brought close to each other, another phenomenon occurs which causes the respective signals to become difficult to catch and distinguish from each other. The present embodiment therefore provides the peak value of the sound pressure level (output level) of the first sounding signal to exist in a frequency band different from that of the peak value of the sound pressure level (output level) of the second sounding signal.

Note that the sound of high frequency may not be easily recognized by elderly people. Suppose that, of the first sounding signal, the frequency which is changed depending on the change of the speed of the vehicle, is assigned with a high frequency. Such assignment with a high frequency provides a difficulty for elderly people to recognize the feeling of the speed of the vehicle. The present embodiment thus provides the peak value of the sound pressure level (output level) of the first sounding signal to exist in a frequency band lower in frequency than that of the second sounding signal.

In addition, the speaker characteristic of the output sound pressure versus frequencies may undesirably decrease the sound pressure of the notice sound with increasing vehicle speed. The present embodiment therefore provides the peak value of the sound pressure level (output level) of the first sounding signal to be located in a subject frequency band that increases the output sound pressure with increasing frequency in the characteristic of the output sound pressure versus frequencies of the speaker 3. That is, the subject frequency is located at the area A in the rightward-steadily-growing range in the characteristic of the output sound pressure versus frequencies with respect to the speaker 3 in FIG. 2.

Figure 3A:
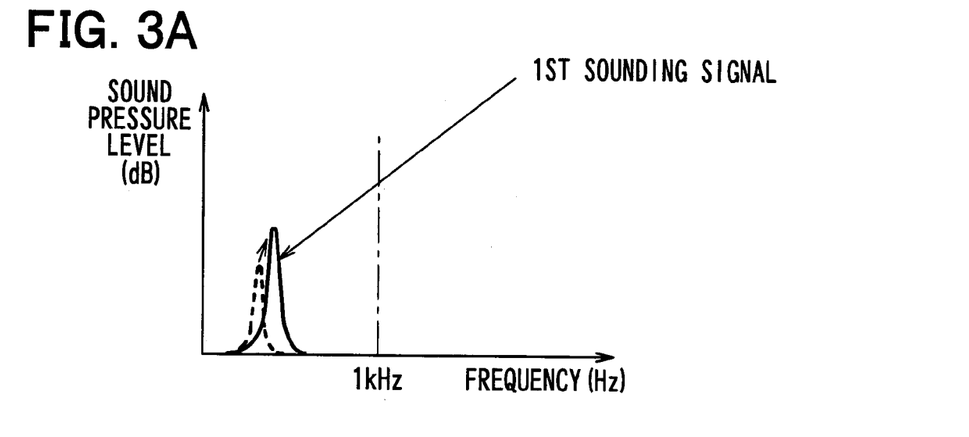
FIG. 3A is a diagram illustrating a frequency characteristic of a first sounding signal at a vehicle speed of 30 km/h.
Figure 3B:
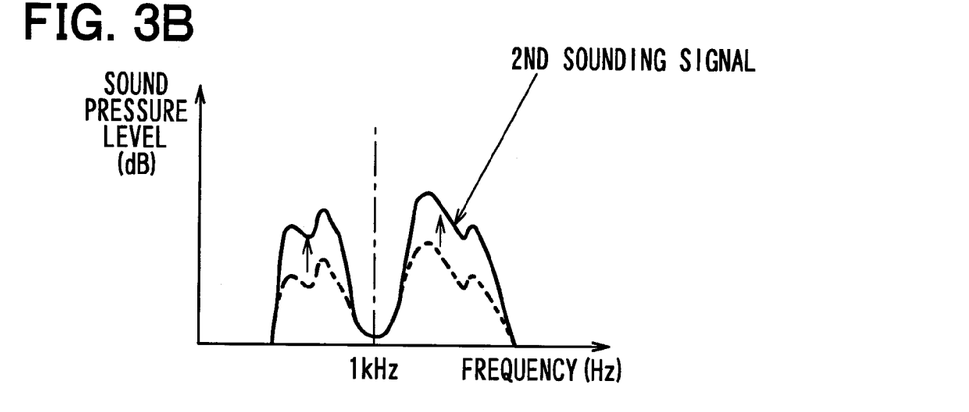
FIG. 3B is a diagram illustrating a frequency characteristic of a second sounding signal at a vehicle speed of 30 km/h.
Figure 3C:
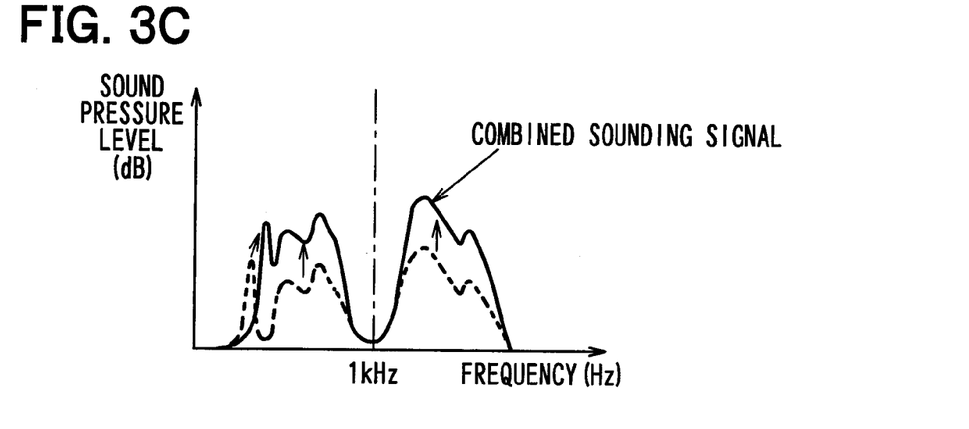
FIG. 3C is a diagram illustrating a frequency characteristic of a notice sound signal combining a first sounding signal with a second sounding signal at a vehicle speed of 30 km/h.

FIGS. 3A to 3C are diagrams illustrating respective frequency characteristics of the first sounding signal Sa, the second sounding signal Sb, and the notice sound signal combining the first sounding signal Sa with the second sounding signal Sb at a vehicle speed of 30 km/h. The dotted lines in FIGS. 3A to 3C indicate respective sounding signals at a vehicle speed of 0 km/h in FIGS. 2A to 2C.

When the speed of the vehicle changes from 0 to 30 km/h, the frequency of the first sounding signal shifts towards a higher frequency while the sound pressure level (output level) of the first sounding signal is increased. In addition, while the frequency of the second sounding signal is held constant, the sound pressure level (output level) of the second sounding signal is increased as the speed of the vehicle is increased.

Figure 4:
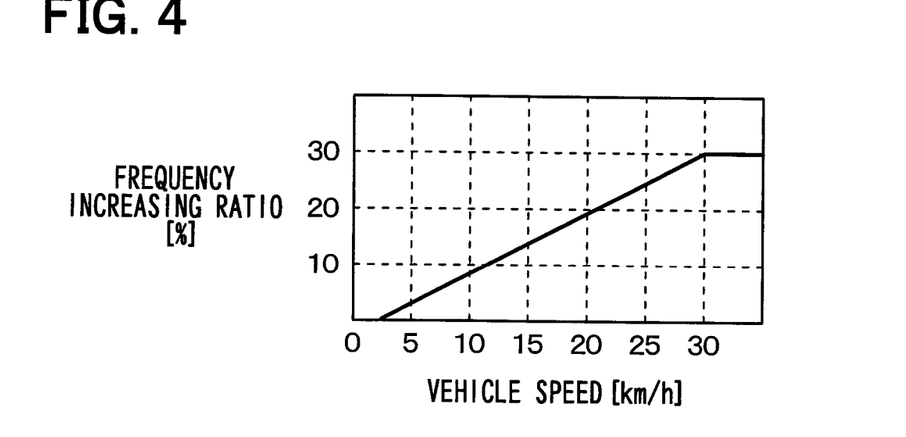
FIG. 4 is a diagram illustrating a relationship between a vehicle speed of a vehicle and a frequency increasing rate in a first sounding signal.

FIG. 4 illustrates a relationship between the speed of the vehicle and the frequency increasing rate in the first sounding signal. In the present embodiment, when the vehicle speed is less than 3 km/h, the frequency change rate is 0%, as in FIG. 4. In addition, when the vehicle speed is from 3 km/h to less than 30 km/h, the frequency increasing rate increases gradually with increasing vehicle speed. When the vehicle speed is equal to or greater than 30 km/h, the frequency change rate comes to be constant at 30%.

Figure 5:
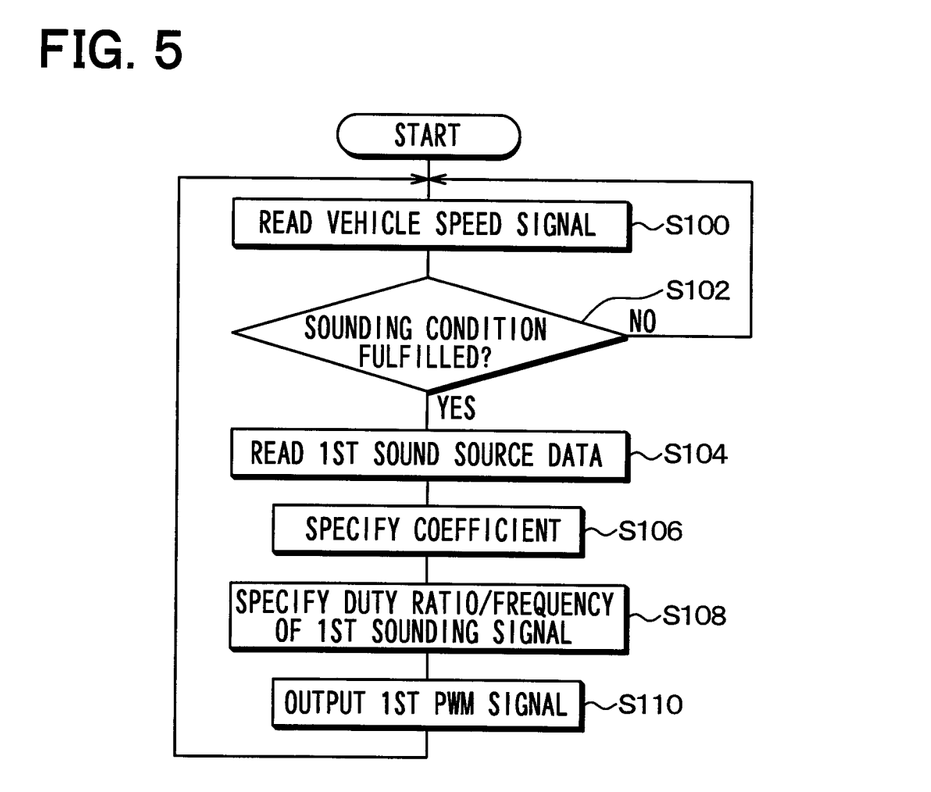
FIG. 5 is a flowchart of a first sounding signal output process by an arithmetic unit of a microcomputer.

FIG. 5 is a flowchart of a first sounding signal output process by the arithmetic unit of the microcomputer 21. When the ignition switch of the vehicle is turned on, the arithmetic unit of the microcomputer 21 executes periodically the process indicated in FIG. 5.

First, the speed signal is read from the speed sensor 1 (S100). Next, it is determined whether the sounding condition is fulfilled (S102). The present embodiment defines the sounding condition as a state where the vehicle runs only using the motor with the engine stopped.

When the vehicle runs with the engine operated, the determination at S102 results in NO, returning the processing to S100. In contrast, when the vehicle runs with the motor operated while the engine stops, the determination at S102 results in YES. Next, the first sound source data 210*a* is read from the memory 200 (S104).

Figure 6:
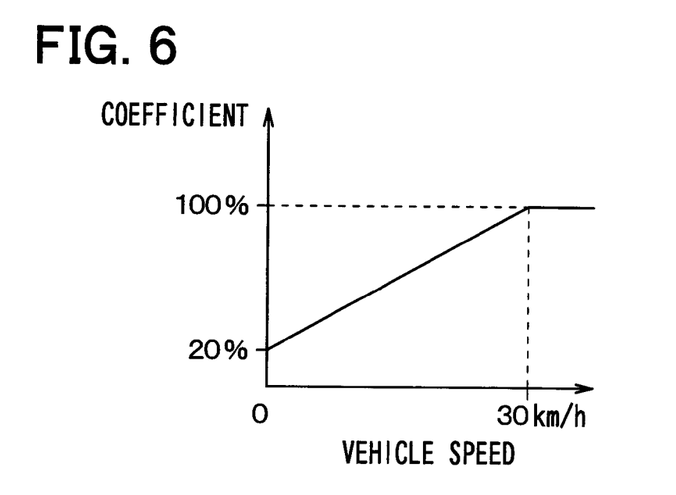
FIG. 6 is a diagram explaining a table stipulating a coefficient for increasing an output level of a first sounding signal.

Next, based on the speed of the vehicle, the coefficient for specifying the duty ratio of the first sounding signal is specified (S106). The memory 200 records a table which specifies coefficients for increasing the output level of the first sounding signal with increasing speed of the vehicle. FIG. 6 illustrates an example of the table indicating the relationship between the vehicle speed and the coefficient with respect to the first sounding signal. With reference to this table, the coefficient corresponding to the speed of the vehicle is specified.

Next, the duty ratio and the cycle of the first sounding signal are specified (S108). To be specific, the duty ratio of the first sounding signal is calculated from the first sound source data 210*a* read from the memory 200, and the calculated duty ratio of each PWM signal is multiplied with the coefficient specified at S106. This specifies the duty ratio of the PWM signal outputted from the PWM signal output part 220*a*. Furthermore, the cycle of the first sounding signal is specified based on the speed of the vehicle. The relationship between the frequency increasing rate and the vehicle speed as in FIG. 4 enables the specification of the frequency of the first sounding signal corresponding to the speed of the vehicle; the specified frequency of the first sounding signal enables the specification of the cycle of the first sounding signal.

Next, the PWM signal output part 220*a* is caused to output the first PWM signal (S110). To be specific, the PWM signal output part 220*a* is instructed to send out the PWM signal with the duty ratio and cycle specified at S108. The processing then returns to S100.

Such a process is executed repeatedly to permit the PWM signal output part 220*a* to send out repeatedly the first PWM signal.

Figure 7:
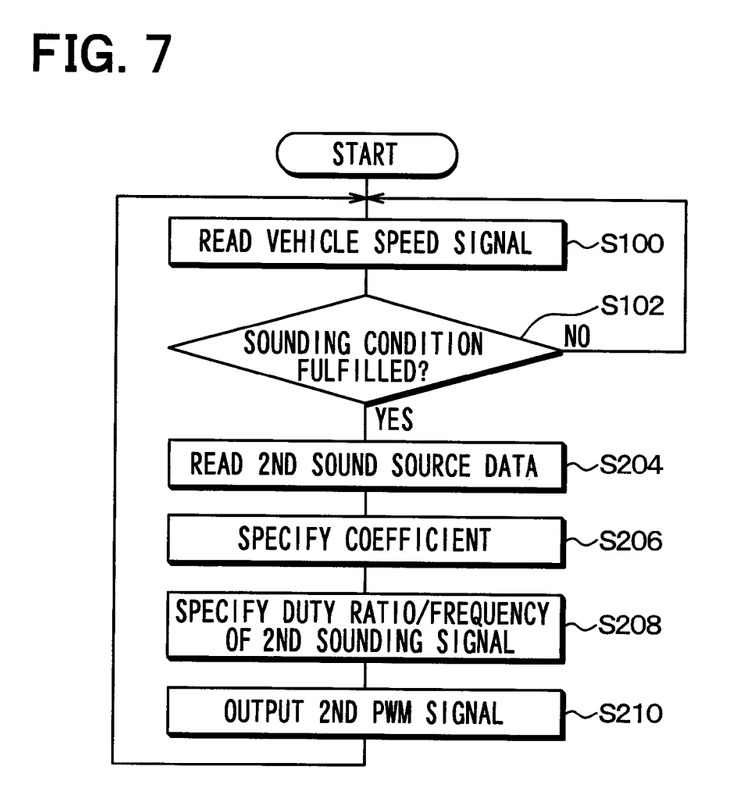
FIG. 7 is a flowchart of a second sounding signal output process by an arithmetic unit of a microcomputer.

FIG. 7 illustrates a flowchart of a second sounding signal output process by the arithmetic unit of the microcomputer 21. When the ignition switch of the vehicle is turned on, the arithmetic unit of the microcomputer 21 executes periodically the process indicated in FIG. 7 in parallel with the process indicated in FIG. 5. Portions identical to those in the process in FIG. 5 are assigned with the identical reference signs and omitted from the explanation; the different portions are mainly explained.

First, the speed signal is read from the speed sensor 1 (S100). When the sounding condition is fulfilled, the determination at S102 results in YES. Next, the second sound source data 210*a* is read from the memory 200 (S204).

Next, based on the speed of the vehicle, the coefficient for specifying the duty ratio of the second sounding signal is specified (S206). The memory 200 records a table which specifies coefficients for increasing the output level of the second sounding signal with increasing speed of the vehicle. With reference to this table, the coefficient corresponding to the speed of the vehicle is specified.

Next, the duty ratio and the cycle of the second sounding signal are specified (S208). To be specific, the duty ratio of the second sounding signal is calculated from the second sound source data 210b read from the memory 200, and the calculated duty ratio of each PWM signal is multiplied with the coefficient specified at S206. This specifies the duty ratio of the PWM signal outputted from the PWM signal output part 220b. Note that the cycle of the second sounding signal is maintained to be still constant.

Next, the PWM signal output part 220b is caused to output the second PWM signal (S210). To be specific, the PWM signal output part 220b is instructed to send out the PWM signal with the duty ratio and cycle specified at S208. The processing then returns to S100.

Such a process is executed repeatedly to permit the PWM signal output part 220b to send out repeatedly the second PWM signal.

The first PWM signal and the second PWM signal are converted into analog signals, respectively, by the LPF 22a and the LPF 22b; combined by the mixer 23; and amplified using the constant amplification factor by the AMP 24. The notice sound is thereby outputted in voice from the speaker 3.

According to the above configuration, the PWM signal output part 220a changes the frequency and the output level of the first sounding signal Sa depending on the speed of the vehicle; the PWM signal output part 220b changes the output level of the second sounding signal Sb depending on the speed of the vehicle while holding the frequency of the second sounding signal Sb constant. This configuration need none of a highly efficient processing circuit that is used to amend the respective frequency components which constitute a notice sound, suppresses the sound pressure of the notice sound from becoming unsuitable due to the influence of the speaker characteristic of the output sound pressure versus frequencies, and enables pedestrians etc. to recognize the feeling of the speed of the vehicle. The configuration further suppresses the disruption of the balance of each frequency component which constitutes the notice sound, the disruption causing the notice sound to sound to be significantly different.

That is, the microcomputer 21 includes the PWM signal output part 220a which changes the frequency and the output level of the first sounding signal Sa depending on change of the speed of the vehicle, and the PWM signal output part 220b which changes the output level of the second sounding signal Sb with increasing speed of the vehicle while maintaining the frequency of the second sounding signal Sb to be constant. The configuration further includes the mixer 23 which generates a notice sound signal by combining the first sounding signal outputted by the first PWM signal output part 220a and the second sounding signal outputted by the second PWM signal output part 220b, and the amplifier 24 which amplifies the notice sound signal generated by the mixer 23 and applies the electric current corresponding to the amplified output to the speaker. Without need of any highly efficient processing circuit, the sound pressure of the notice sound may be suppressed from becoming unsuitable due to the influence of the speaker characteristic of the output sound pressure versus frequencies, while pedestrians etc. are enabled to recognize the feeling of the speed of the vehicle.

In addition, the PWM signal output part 220a shifts the frequency of the first sounding signal to a higher frequency and increases the output level of the first sounding signal as the speed of the vehicle increases; the PWM signal output part 220b increases the output level of the second sounding signal with increasing speed of the vehicle while holding the frequency of the second sounding signal constant. The sound pressure of the notice sound is suppressed from becoming unsuitable due to the influence of the speaker characteristic of the output sound pressure versus frequencies, and some frequency components of the notice sound are permitted to become high-pitched sound (high sound) with increasing speed of the vehicle. Thus, pedestrians etc. are enabled to recognize the feeling of the speed of the vehicle. The configuration further suppresses the disruption of the balance of each frequency component which constitutes the notice sound, the disruption causing the notice sound to sound to be significantly different.

In addition, the peak value of the output level of the first sounding signal whose frequency changes depending on the change in the speed of the vehicle is higher than the peak value of the output level of the second sounding signal whose frequency is held constant. This suppresses a phenomenon called masking from occurring. This masking is caused by the frequency component of the second sounding signal that buries the frequency component of the first sounding signal to be difficult to catch. The pedestrians etc. are thus enabled to recognize the feeling of the speed of the vehicle more certainly.

Note that when mutually different frequencies of two signals are brought close to each other, another phenomenon occurs which causes the respective signals to become difficult to catch and difficult to distinguish from each other. According to the above configuration, the peak value of the output level of the first sounding signal and the peak value of the output level of the second sounding signal are located separately in the mutually different frequency bands. The frequency component of the first sounding signal and the frequency component of the second sounding signal can be distinguished from each other to be audible. The pedestrians etc. are thus enabled to recognize the feeling of the speed of the vehicle more certainly.

In addition, the sound with high frequency cannot be easily recognized by elderly people. When the frequency of the first sounding signal whose frequency changes depending on change of the speed of the vehicle is a high frequency, elderly people cannot easily recognize the feeling of the speed of the vehicle. According to the above configuration, the peak value of the output level of the first sounding signal whose frequency changes depending on the change in the speed of the vehicle is located in a frequency band lower than that of the peak value of the output level of the second sounding signal whose frequency is held constant. In particular, elder people are thus enabled to recognize the feeling of the speed of the vehicle.

In addition, the peak value of the output level of the first sounding signal is included in a frequency band where the output sound pressure increases with increasing frequency in the characteristic of the speaker. This enables the sound pressure of the notice sound to increase certainly as the vehicle speed increases.

In addition, the 125-315 Hertz frequency band is a frequency band for pedestrians etc. to be not disagreeable to the ear, i.e., a frequency band providing favorable receptiveness. Preparing the peak value of the output level of the first sounding signal to be in such 125-315 Hertz frequency band enables pedestrians etc. to recognize the feeling of the speed of the vehicle more certainly.

In addition, the 1200-2000 Hertz frequency band is a frequency band allowing the sensitivity of human being's hearing to become high. Preparing the peak value of the output level of the first sounding signal to be in such 1200-2000 Hertz frequency band also enables pedestrians etc. to recognize the feeling of the speed of the vehicle more certainly.

In the above embodiment, the PWM signal output parts 220a and 220b, the LPFs 22a and 22b, and the mixer 23 constitute a notice sound generation device. In addition, the PWM signal output parts 220a and 220b correspond to a first sounding signal generation portion and a second sounding signal generation portion, respectively; the mixer 23 corresponds to a combination portion. Furthermore, the memory 200 corresponds to a storage unit; the microcomputer 21 corresponds to a control unit. In addition, in the above embodiment, the determination of the speed of the vehicle may be performed by a vehicle speed determination portion.

In addition, the present disclosure is not limited to the above embodiment and can be achieved in various modified manners based on the scope of the present disclosure.

For example, although the above embodiment indicates the configuration which generates the first sounding signal and the second sounding signal using the signals which have undergone the PWM modulation, there is no need to be limited to such a configuration.

Further, the above embodiment describes an example where the peak value of the output level of the first sounding signal is provided to be higher than the peak value of the output level of the second sounding signal, while the peak value of the output level of the first sounding signal and the peak value of the output level of the second sounding signal are located separately in the mutually different frequency bands. In contrast, the peak value of the output level of the first sounding signal and the peak value of the output level of the second sounding signal do not necessarily exist separately in the mutually different frequency bands.

Figure 8A:
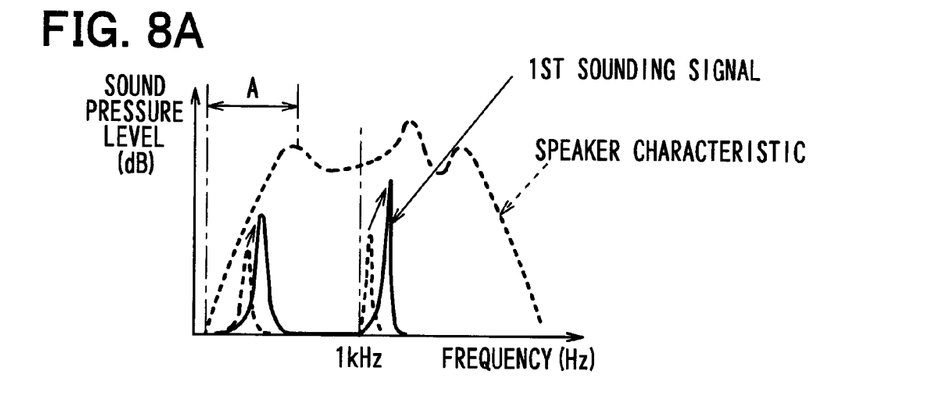
FIG. 8A is a diagram illustrating a frequency characteristic of a first sounding signal according to a modification example.
Figure 8B:
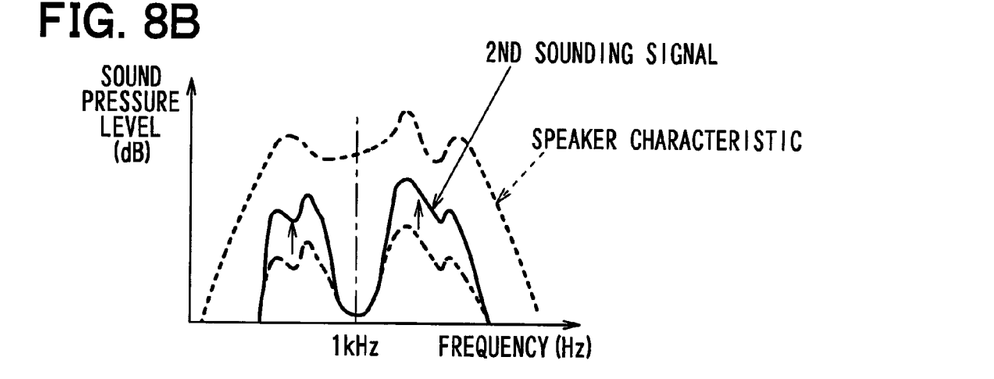
FIG. 8B is a diagram illustrating a frequency characteristic of a second sounding signal according to a modification example.
Figure 8C:
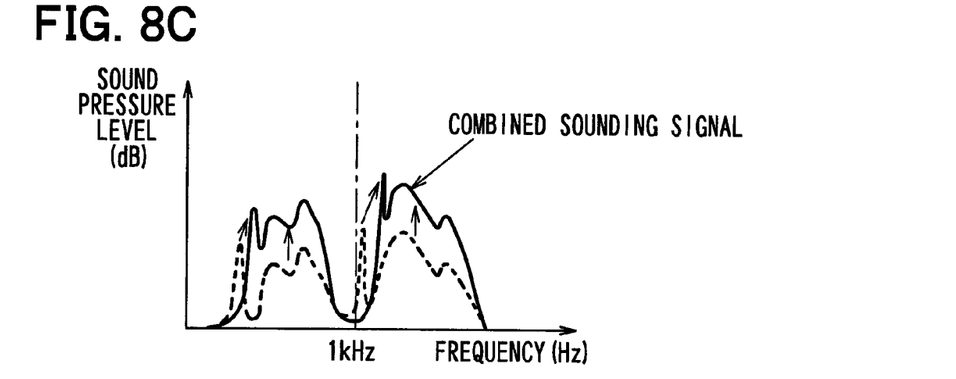
FIG. 8C is a diagram illustrating a frequency characteristic of a notice sound signal combining a first sounding signal with a second sounding signal according to a modification example.

In addition, the above embodiment describes an example where the peak value of the output level of the first sounding signal is included in the 125-315 Hertz frequency band, as in FIGS. 2A-2C. Without need to be limited thereto, as indicated in FIGS. 8A-8C, the first sounding signal values may be included in both the 125-315 Hertz frequency band and the 1200-2000 Hertz frequency band. In addition, although unshown, the peak value of the output level of the first sounding signal may be included only in the 1200-2000 Hertz frequency band.

In addition, the above embodiment describes the configuration where the memory 200 is contained inside of the microcomputer 21; an alternative configuration may be provided which provides the memory 200 separately outside of the microcomputer 21.

What is claimed is:

1. A vehicle approach notification apparatus including a notice sound generation device that generates a notice sound signal corresponding to a notice sound that is to be outputted via a speaker,
    the notice sound generation device comprising:
    a first sounding signal generation portion that generates a first sounding signal based on a first sound source data;
    a second sounding signal generation portion that generates a second sounding signal based on a second sound source data; and
    a combination portion that combines the first sounding signal with the second sounding signal, generating the notice sound signal,
    wherein:
    the first sounding signal generation portion changes a frequency and an output level of the first sounding signal depending on a speed of a vehicle; and
    the second sounding signal generation portion changes an output level of the second sounding signal depending on the speed of the vehicle while holding a frequency of the second sounding signal to be constant.

2. A vehicle approach notification apparatus mounted to a vehicle, the apparatus permitting a speaker to output a notice sound according to a notice sound signal,
    the apparatus comprising:
    a vehicle speed determination portion that determines a vehicle speed of the vehicle;
    a storage unit that stores a first sound source data and a second sound source data;
    a control unit that generates a first sounding signal based on the first sound source data and a second sounding signal based on the second sound source data, the control unit including
        a first sounding signal generation portion that changes a frequency and an output level of the first sounding signal depending on a change of the vehicle speed, and
        a second sounding signal generation portion that changes an output level of the second sounding signal depending on the change of the vehicle speed while maintaining a frequency of the second sounding signal to be constant;
    a combination portion that combines the first sounding signal outputted from the first sounding signal generation portion with the second sounding signal outputted from the second sounding signal generation portion, generating the notice sound signal; and
    an amplifier that amplifies the notice sound signal generated by the combination portion to provide an amplified output and applies an electric current corresponding to the amplified output to the speaker.

3. The vehicle approach notification apparatus according to claim 2, wherein:
    the first sounding signal generation portion shifts the frequency of the first sounding signal to a higher frequency and increases the output level of the first sounding signal as the vehicle speed increases; and
    the second sounding signal generation portion changes the output level of the second sounding signal as the vehicle speed increases while holding the frequency of the second sounding signal to be constant.

4. The vehicle approach notification apparatus according to claim 2, wherein
    a peak value of the output level of the first sounding signal is higher than a peak value of the output level of the second sounding signal.

5. The vehicle approach notification apparatus according to claim 2, wherein
    a peak value of the output level of the first sounding signal and a peak value of the output level of the second sounding signal are located separately in mutually different frequency bands.

6. The vehicle approach notification apparatus according to claim 2, wherein
    a peak value of the output level of the first sounding signal is located in a frequency band lower in frequency than a frequency band where a peak value of an output level of the second sounding signal is located.

7. The vehicle approach notification apparatus according to claim 2, wherein
    a peak value of the output level of the first sounding signal is included in a frequency band where an output sound pressure increases with increasing frequency in a characteristic of the speaker.

8. The vehicle approach notification apparatus according to claim 2, wherein a peak value of the output level of the first sounding signal is included in a frequency band ranging from 125 to 315 Hertz.

9. The vehicle approach notification apparatus according to claim 2, wherein
a peak value of the output level of the first sounding signal is included in a frequency band ranging from 1200 to 2000 Hertz.

\* \* \* \* \*